United States Patent [19]
Paris

[11] Patent Number: 5,106,427
[45] Date of Patent: Apr. 21, 1992

[54] PROCESS AND APPARATUS FOR WASHING INSULATORS

[75] Inventor: Luigi Paris, Rome, Italy

[73] Assignee: Cantamessa G.F. S.p.A., Italy

[21] Appl. No.: 272,753

[22] PCT Filed: Apr. 1, 1987

[86] PCT No.: PCT/EP87/00177
§ 371 Date: Oct. 3, 1988
§ 102(e) Date: Oct. 3, 1988

[87] PCT Pub. No.: WO87/06068
PCT Pub. Date: Oct. 8, 1987

[30] Foreign Application Priority Data
Apr. 3, 1986 [IT] Italy .............................. 19963 A/86

[51] Int. Cl.$^5$ ............................................. B08B 3/02
[52] U.S. Cl. ..................................... 134/34; 134/180
[58] Field of Search .................................. 134/34, 180

[56] References Cited
FOREIGN PATENT DOCUMENTS
2123203 8/1972 Fed. Rep. of Germany .

Primary Examiner—Asok Pal
Attorney, Agent, or Firm—Venable, Baetjer and Howard

[57] ABSTRACT

Process for washing insulators supporting the conductors of an overhead electric live line, with the line energized, by means of a washing head (T) connected to means feeding a detergent fluid to a plurality of spray nozzles (14, 114) carried by the washing head (T) for spraying detergent fluid in close proximity to and over the surface of said insulator (3, 3A), characterized in that the washing head (T) is centered and anchored onto the insulator, and the washing of the insulator is carried out by feeding the detergent fluid to at least part of a plurality of tubular members (13, 113) connected to the washing head, the tubular members being positioned one above the other so as to be insulated one from the other and, in use, at least partially surrounding the insulator.

39 Claims, 6 Drawing Sheets

PROCESS AND APPARATUS FOR WASHING INSULATORS

TECHNICAL FIELD

The invention concerns a process and an apparatus for washing insulators supporting overhead electric live lines. Hereinafter, the term "insulators" stands both for pin insulators and for insulator chains.

It is known that insulators supporting overhead electric lines are subject, in areas with a prevalently dry climate, to the settlement of impurities and atmospheric dust, which is not always entirely removed by the occasional action of rain. It is also known that the wet, or even simply damp surface of the insulator causes—especially in coastline areas, where the atmospheric dust is filled with sea salts—a phenomenon of surface conductivity of the insulator.

This phenomenon, which can be considered scarcely important in very rainy areas—where the "self-washing" action produced by rain keeps the insulator sufficiently clean—can instead determine serious difficulties on operation, in scarcely rainy areas where the heaping up of sea salts on the insulators can reach high percentages.

BACKGROUND ART

At present, to prevent the above phenomenon of surface conductivity of the insulators, maintenance operations are carried out, consisting in a more or less frequent washing of said insulators. This operation is carried out by deenergizing the line and manually washing the insulator. Nevertheless, these out-of-commission intervals on the line create problems for the users, so that it would be desirable to reduce them to a minimum.

For this purpose, the washing operation is also carried out on the live line, by spraying jets of detergent fluid from a distance sufficient to prevent discharges between the live parts and the spray nozzle, but with evident risks for the operators. Besides, this system is on one hand apt to determine discharges on the insulator—especially on mean-voltage lines, wherein the insulator is fairly small and is thus thoroughly hit by the fluid jet—and on the other hand it is scarcely efficient, due to the great distance between the nozzle and the insulator.

An improved apparatus, in respect of the simple washing jet controlled by a ground operator, is that described in the DE-A-2123203, which comprises a tubular U-shaped member provided with a plurality of nozzles, to which detergent fluid is fed through a pipe connected to a reservoir placed on the ground. The tubular U-shaped member is fixed to the end of an insulating rod, which is handled by an operator standing onto the bracket of a pole supporting the insulator to be washed. The operator moves the insulating rod so as to keep the tubular U-shaped member substantially centered in respect of the insulator, so that the jets of detergent fluid sprayed from the nozzles may reach the entire surface of the insulator. The operator must also move the insulating rod so as to shift the tubular U-shaped member along the whole insulator.

Nevertheless, this apparatus has at least the following drawbacks:

- the operator has to work in difficult conditions, as he is expected to climb up onto the pole bracket and to operate with a very long rod (the rod is certainly longer than 4 or 5 m, as it has to reach every part of the insulator), which is therefore awkward to handle;
- these difficult operating conditions are in contrast with the fact that the operation must be carried out with high precision, keeping the tubular U-shaped member always centered in respect of the insulator and shifting said tubular U-shaped member along the whole length of the insulator;
- the whole washing operation is very slow, since the single tubular U-shaped member has to be shifted along the entire insulator, making sure that the washing is carried out properly on each part thereof; to this there should be added the fair amount of time required for the operator to reach his working position;
- the insulating conditions are quite precarious, since the tubular U-shaped member—merely operated by means of the long control rod—can easily get in contact with the body of the insulator and, in certain circumstances, favor an electric discharge along the actual insulator.

The DE-A-3310764 adds nothing to the teaching of the DE-A-2123203, except for suggesting to use a special detergent fluid, apt to facilitate removal of the dirt collected onto the insulator.

The AT-B-335548 concerns instead a washing apparatus comprising a two-valve boxlike body which totally envelops the insulator and into which is circulated the detergent fluid. Since the boxlike body encloses the electric conductor as well as the support base of the insulator, this apparatus can practically be used only after the line has been deenergized. In the contrary event, there would be serious problems of insulation and great risks of electric discharges between the pole bracket and the conductor.

The main object of the present invention is a process and an apparatus for washing insulators, of the type described in the introductory part of claims 1 and 14, by means of which it is possible to carry out the whole washing operation rapidly, while avoiding or reducing to a minimum the risk of electric discharges along the insulator. Another object of the invention is to propose an apparatus which is particularly suited to be fully automated. All these results are obtained thanks to the characteristics described in the characterizing part of claims 1 and 14.

In actual fact, by providing to anchor and center the washing head on the insulator and by using a plurality of tubular U-shaped members, each having a plurality of spray nozzles, it is possible—on one hand—to greatly facilitate the correct, automatic positioning of the washing head, centering the nozzles in respect of the insulator, and—on the other hand—to very rapidly carry out the washing, for example by simply changing over the feeding of detergent fluid from one tubular member to another, and all this in safe conditions, thanks to the fact that the tubular members are electrically insulated one from the other.

According to a particular embodiment, the washing of the insulator is carried out in parts, at different levels, by hitting in succession single parts of the insulator with said jets of detergent fluid, while simultaneously blowing drying air on the other parts.

By the term "single parts of the insulator" is meant both a single petticoat and two or more petticoats of the insulator, that is, in any case, only a single portion of the entire insulator system—whether it be a pin insulator or an insulator chain—interposed between the earth and the live line.

Different considerations lie at the basis of the invention: on one hand that, the more powerful, abundant and uniform the wash, the less the risk of discharges along the insulator surface; on the other hand that, a powerful and uniform wash also improves the quality of the cleaning operation; furthermore that, it is practically impossible to carry out a sufficiently powerful wash with jets sprayed from nozzles, which are so far as to guarantee a kind of insulation simply on account of the distance; and finally that, a safe insulation towards the operator can more easily be obtained with a suitably insulated support, even if it is quite close to the insulator.

Moreover, the possibility offered by the invention to operate close to the surfaces being washed, allows to use positively lower quantities of detergent fluid, which reduces both the problems of supply and those of local pollution, in case of having to use a polluting detergent.

According to another important aspect of the invention, it has been proved that, even in hard conditions, with higher voltages, any risk of discharges can be avoided if the insulator is washed in parts, at different levels, that is, if the washing is carried out on one part of the insulator at a time, while the other overhanging or underlying parts are forcedly kept dry.

BRIEF DESCRIPTION OF THE DRAWINGS

Further characteristics and advantages of the present invention will anyhow be evident from the following description of some preferred embodiments thereof, illustrated by way of example on the accompanying drawings, in which.

BEST MODES FOR CARRYING OUT THE INVENTION

As shown in the drawings, at the top of a pole 1 for a mean-voltage electric line, there are fixed cross arms 2 carrying pin insulators 3 for supporting the conductors C of the electric line. The assembly of such elements is well known and is not therefore described herein in further detail.

The washing apparatus comprises a washing head T, which can be carried in proximity to the insulator 3 by semiautomatic systems. One of these systems is illustrated in FIG. 1A, which shows a remote control—represented herein by a base 4 and by articulated arms 7—which is in turn carried by a pair of articulated arms 5, fixed on the self-propelled carriage 6, and the motion of which is controlled through a hydroelectric power plant (not shown) fixedly connected to the carriage 6.

The base 4 of the remote control is preferably formed of two parts 4a and 4b, which are mutually connected through an insulating body 4c. The part 4a is earthed by way of the cable 4d, while the part 4b is insulated therefrom, to prevent that an accidental contact between the remote control and the live parts of the line—failing the earth—may energize the carriage 6 onto which stand the operators.

The remote control 4,7 allows an operator, standing on the ground or on the carriage 6, to operate the washing head T. The operation of such remote controls is known per se and will hence not be described in detail.

Figure 1A:
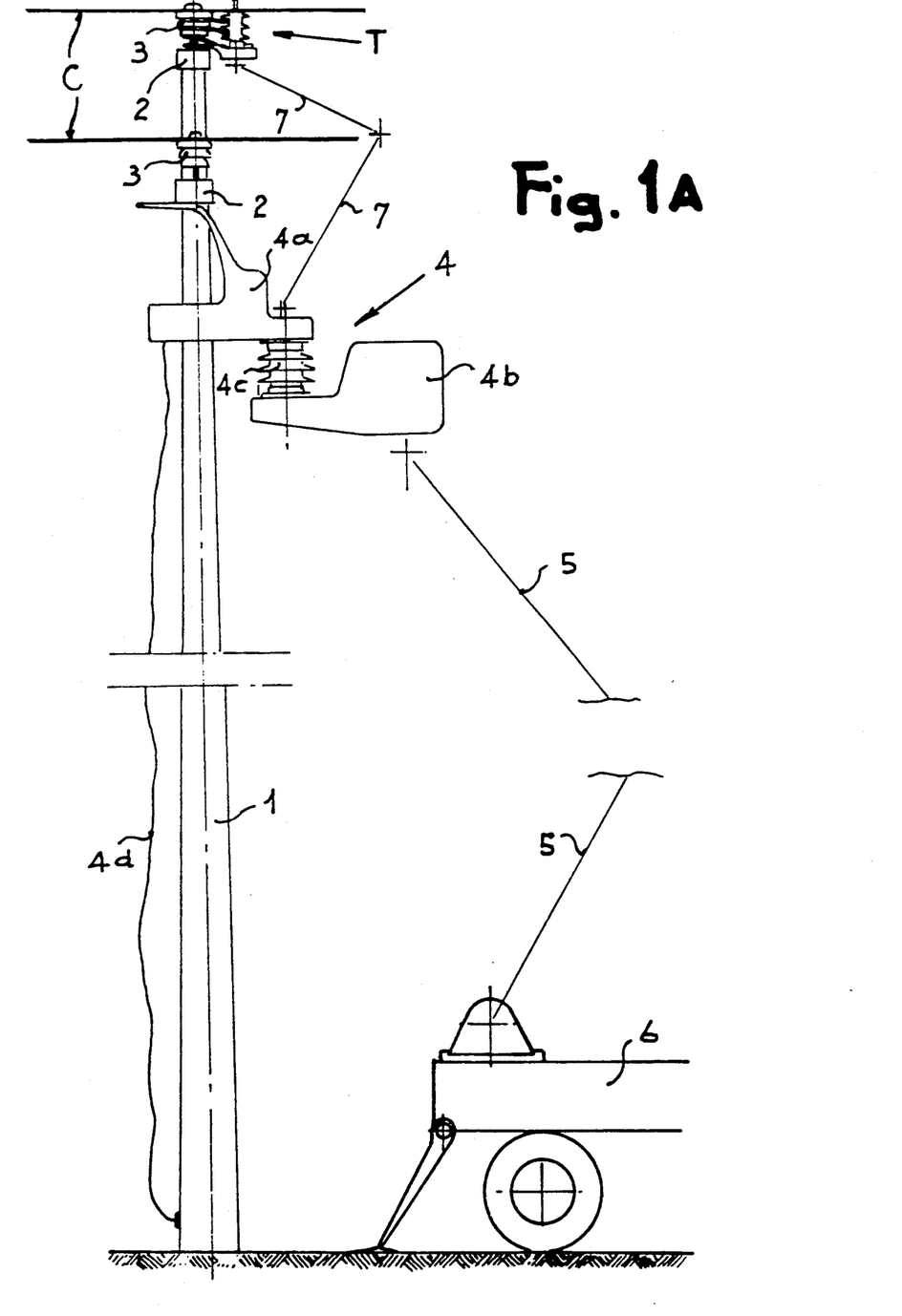
FIG. 1A shows diagrammatically an apparatus according to the invention, with the washing head mounted on a remote control, which is in turn mounted on a self-propelled carriage, the whole in a working position.
Figure 1B:
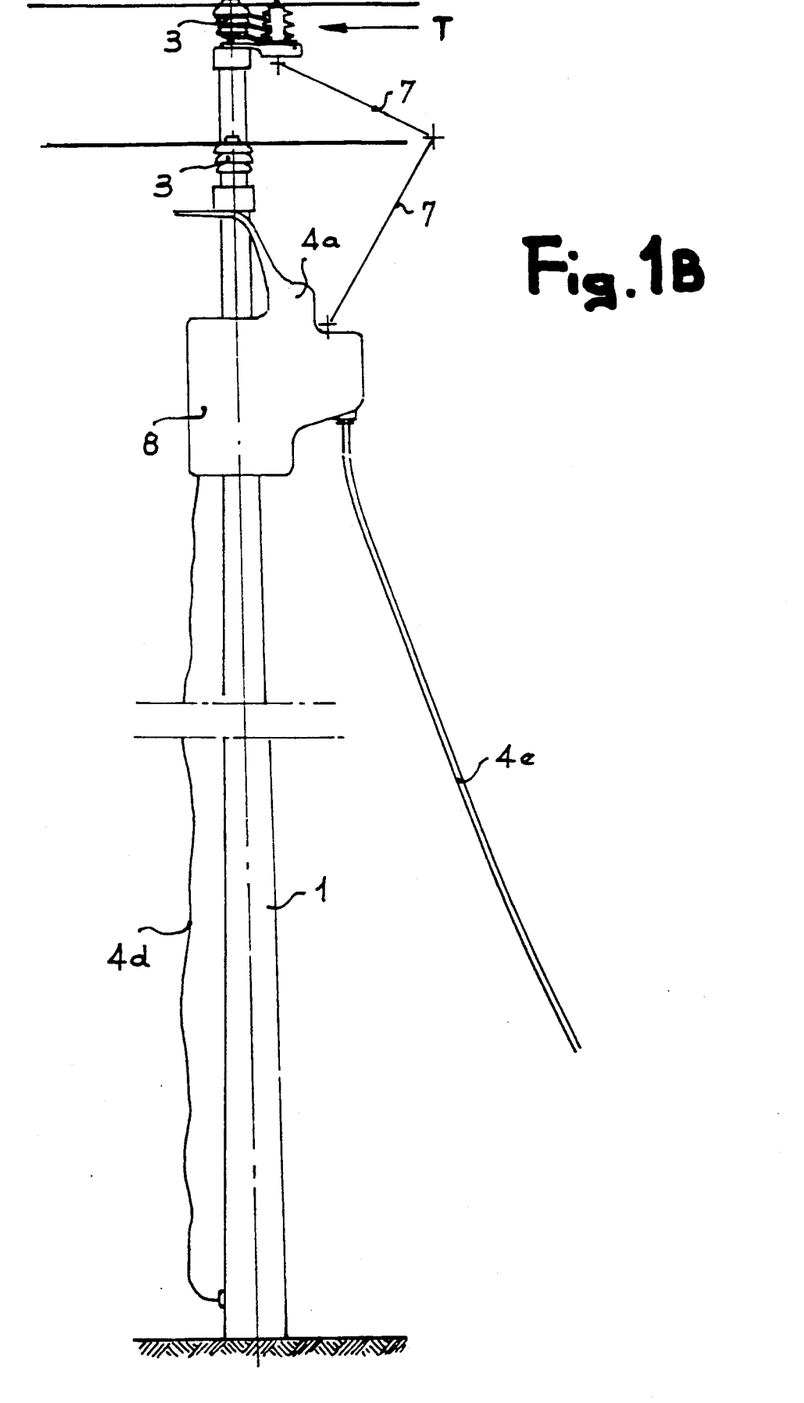
FIG. 1B shows, also diagrammatically, the washing apparatus, with washing head mounted on a remote control, which is in turn mounted on a trolley slidable along the pole supporting the electric line, the whole in a working position.

As an alternative to the arrangement shown in FIG. 1A, it is also possible to use an apparatus as that shown in FIG. 1B, wherein the remote control is mounted on a trolley 8. The structure of the remote control, of its articulated arms 7 and of the head T, is exactly like that illustrated in FIG. 1A. Whereas the trolley 8, not shown in detail, can be anchored directly onto the pole 1, along which it is apt to slide so as to be shifted from the base, up to almost the top of the pole 1. The insulation to earth of the trolley 8 is also guaranteed thanks to the use of feed pipes 4e, made of insulating material.

Figure 2:
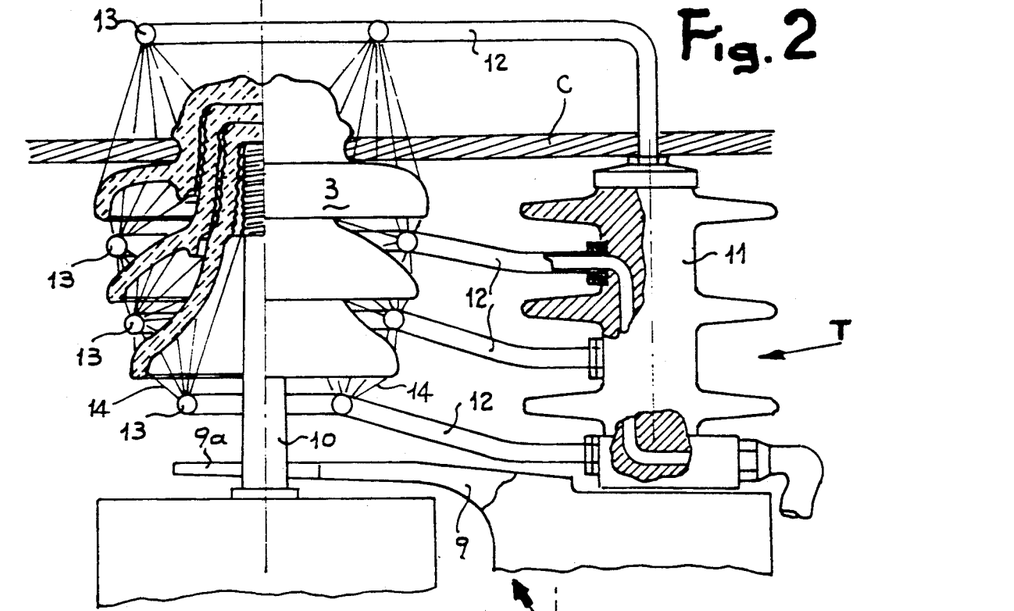
FIG. 2 shows merely the washing head operating on a pin insulator for mean-voltage lines.
Figure 3:
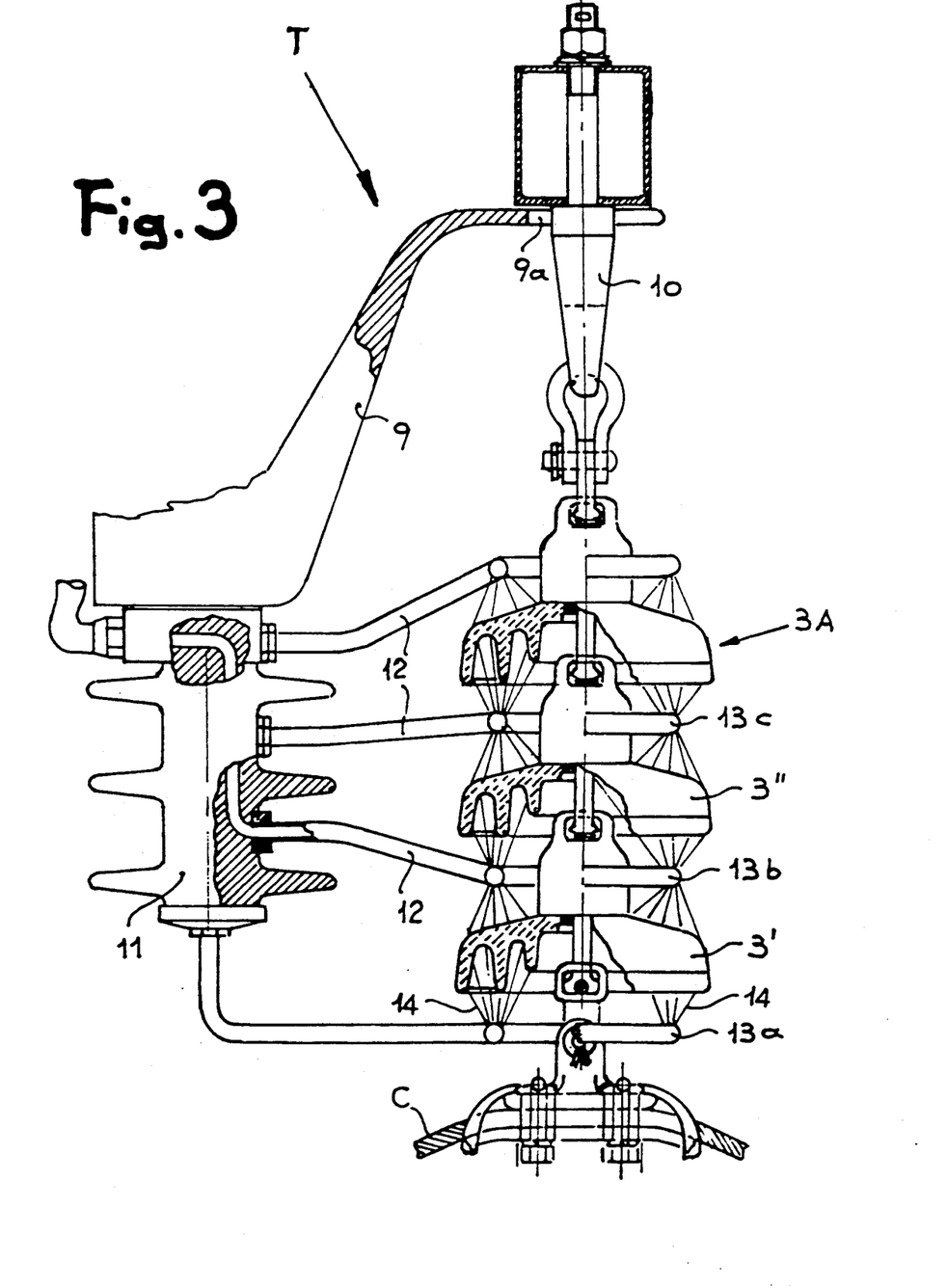
FIG. 3 is an elevation view of a washing head operating on an insulator chain.

As shown in FIGS. 2 or 3, the washing head T comprises an anchorage base 9, extending into a tailpiece 9b, which is provided with a centering slit 9a designed to cooperate—for centering the head T in respect of the insulator—with the base 10 supporting the pin insulator 3, or with the base 10A supporting the insulator chain 3A.

The head T comprises furthermore a pair of insulating bodies 11 (see also FIGS. 4A and 4B), each of which carries a plurality of arms 12 at different levels (FIGS. 2 and 3), each of said arms carrying a tubular half-ring 13. When the head T is in rest conditions, the arms 12 are set apart (FIG. 4B) and the respective half-rings 13 are mutually spaced. Whereas, when the head T is carrying out the washing, the arms 12 are drawn close and the half-rings 13 are coupled so as to form continuous rings (FIGS. 4A, 2 and 3) all around the insulator.

Figure 4A:
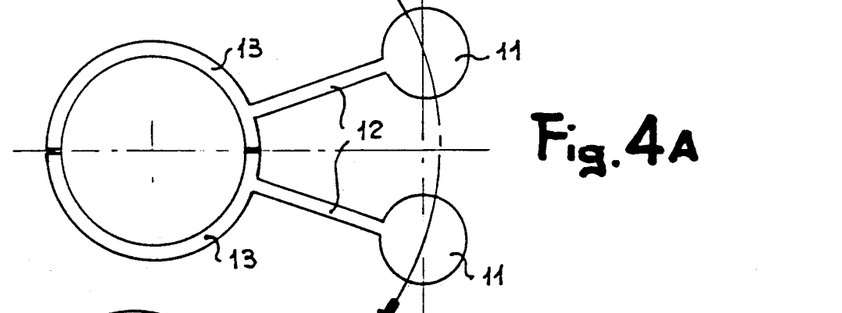
FIGS. 4A and 4B are diagrammatic plan views, illustrating the distribution rings and the respective oscillating support arms, together with the insulating bodies of the washing head.
Figure 4B:
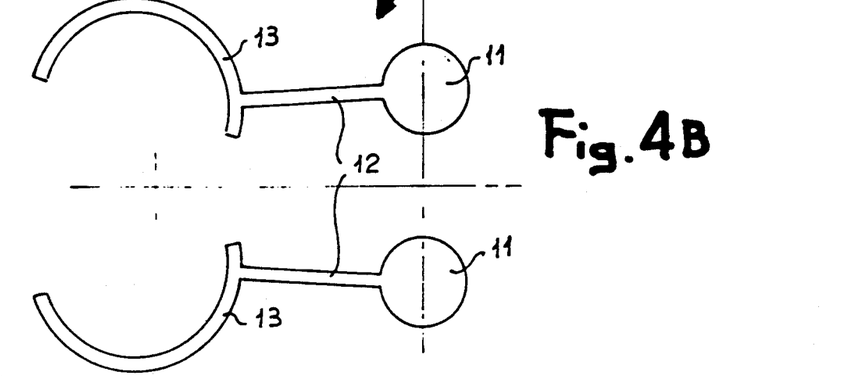

In the arrangement shown in FIGS. 4A and 4B, the arms 12 are fixedly connected to the insulating bodies 11, and these latter are apt to perform a limited rotary motion, so as to allow the arms 12 to draw close and apart.

Figure 5:
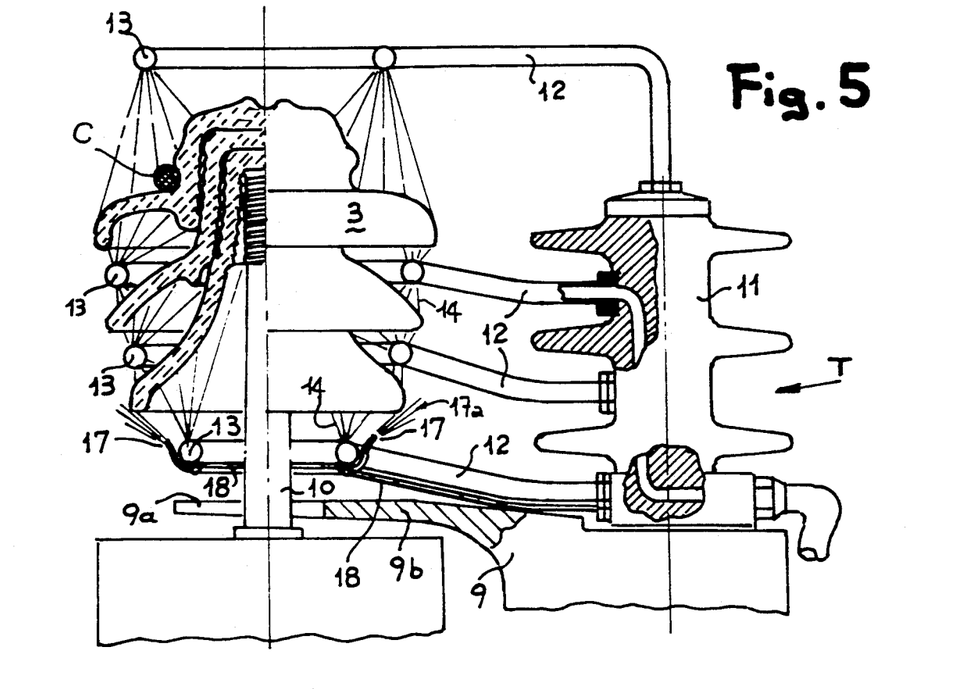
FIG. 5 is a view similar to that of FIG. 2, showing a pneumatic screening system.

FIG. 5 shows a screening system consisting of a plurality of nozzles 17, positioned just above any one of the rings 13, for instance the lowest ring 13 of the set—as shown—or even one of the intermediate rings. The nozzles 17 are fed with compressed air through a feed pipe 18. Said nozzles 17 are preferably mounted on the rings 13 in a position just inside the lower edge of the overhanging insulator 3, and they are positioned radially, with outwardly directed jet 17a. Said nozzles are apt to perform a double function, better described hereinafter.

Figure 5A:
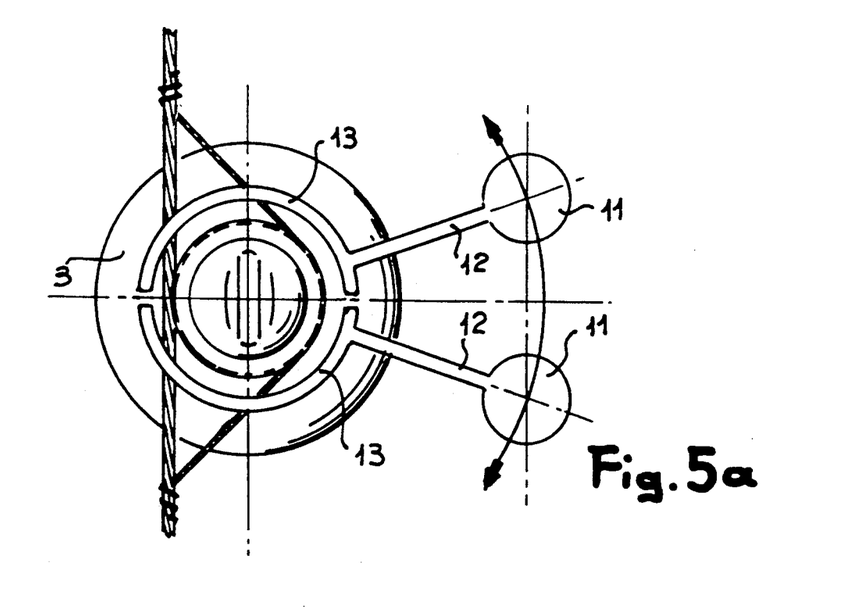
FIG. 5A represents a modified embodiment.

A modified embodiment, (as shown in FIG. 5A), can provide for a single insulating body 11, essentially fixed, onto which are mounted rings apt to perform a limited rotation, an arm 12 being associated to each ring.

Figure 6:
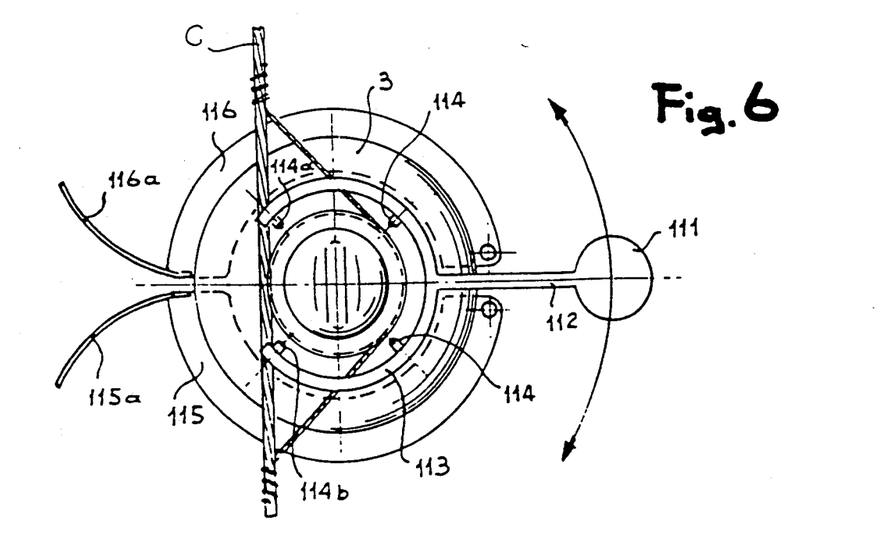
FIG. 6 is a plan view, similar to that of FIGS. 4A and 4B, showing a modified embodiment of the washing apparatus.
Figure 7:
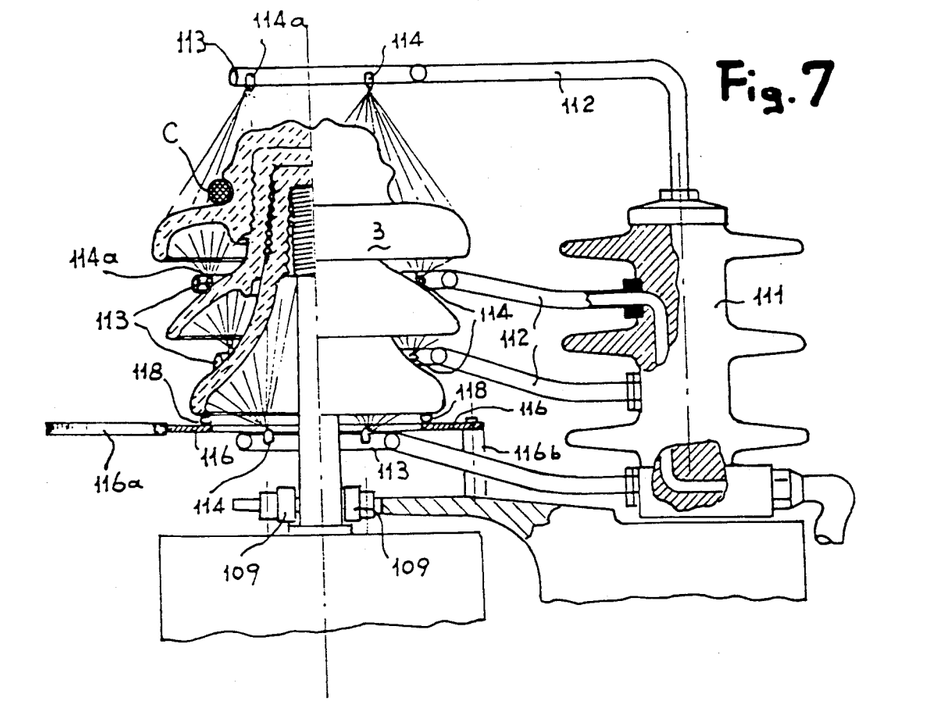
FIG. 7 is an elevation view, similar to that of FIG. 3, showing the embodiment of FIG. 6.

FIGS. 6 and 7 show a modified embodiment with a single insulating body 111, from which projects a single set of tubular arms 112, each of which carries a tubular body 113, formed as an open ring and developing over an arc of about 270°.

Four nozzles 114 are mounted on the open ring 113, said nozzles being evenly distributed along its contour, at about 90° one from the other. The two nozzles 114a and 114b are mounted in correspondence of the free ends of the open ring 113 (as clearly shown in FIG. 6).

The opening of the ring 113, i.e. the distance between the end nozzles 114a and 114b, is wider than the maximum width of the insulator, in this way, the ring 113—though being in one piece, and not in two separable parts like the ring 13—can easily be led to envelop the insulator.

FIGS. 6 and 7 show furthermore a different screening system, consisting of plates 115 and 116. Each of said plates has a substantially semicircular crown shape. Such plates are positioned just under the lowest petticoat of the insulator 3 and they are each hinged, in 115b and 116b, onto the anchorage base 9 of the head T. Spring means (not shown) tend to push the plates 115 and 116 one towards the other, so as to form a substantially continuous circular crown.

Along their inner contour, the plates 115 and 116 comprise a sealing gasket 118, of very resilient rubber or of synthetic sponge, which—when said plates are closed into a crown—bears against the inner edge of the lower contour of the petticoat of the overhanging insulator 3.

At the end opposite to the hingeing end, the plates 115 and 116 comprise outwardly curved strips 115a and 116a which, in the closed position shown in FIG. 6, form a kind of funnel or trumpet, the function of which, like that of the plates 115 and 116, will be better described hereinafter.

FIG. 7 also shows a different device for anchoring and centering the base 9 on the insulator support 10, said device consisting of a pair of jaws 109, hinged on the base 9 and apt to be opened and closed onto the support 10 under control. As the jaws tighten against said support, the head T becomes centered in respect of the insulator and its safe anchorage is obtained.

The plates 115 and 116, instead of being hinged onto the anchorage base 9, can be mounted directly onto one of the arms 112 supporting the rings 113, or they can also eventually each be separately mounted on one of the jaws 109.

As more apparent from FIGS. 2 and 3, and as already said, the tubular distribution rings are positioned at different levels and each have a plurality of nozzles. Preferably, the rings 13 are in close proximity to the insulator 3 and preferably, as shown in the drawings, in the space delimited by two insulator petticoats and within the surface of enclosure of the actual insulator.

As can be seen from the drawings, the cavity of each of the tubular rings 13 communicates with the cavity of the respective support arm 12 and this latter communicates with a respective feed pipe 14. Detergent liquid—usually demineralized water—or, alternatively, drying air, for instance dry hot air, is fed through said feed pipe to the nozzles of the rings 13.

In a preferred embodiment, each of the rings 13 and respective arms 12 is connected to a feed pipe 14 of its own, so as to allow feeding detergent liquid to one or more of the rings 13, while the other rings are being fed with drying air. The carriage 6 is provided with conventional means for respectively feeding liquid and air towards the remote control 4, through two distinct feed pipes (not shown) anchored to the arms 5. The remote control 4,7 is instead provided with air/liquid change-over means, in order to selectively connect the liquid and air feed pipes to one or the other of the pipes 14. Such change-over means are not shown in the drawings, as they form part of known technique and can easily be obtained by an expert in the field.

The working of the washing apparatus is described first of all with reference to FIGS. 1A and 2. Once the remote control 4,7 has been moved close to the top of the pole 1, by means of the articulated arms 5, the articulated arms 7 and thus the washing head T are moved up to anchoring the base 9 onto the insulated base 10 of the pin insulator 3 (FIG. 2), or onto the base 10A of the insulator chain 3A (FIG. 3). The insulating bodies 11, and thus the arms 12, are then rotated up to closing the half-rings 13, and forming continuous rings around the insulator and strictly close thereto.

According to the modified embodiment of FIG. 1B, one provides instead to anchor the trolley 8 onto the base of the pole 1 and then to control its upward shifting until it gets close to the cross arms 2. Having reached this point, the trolley 8 is blocked and—as in the embodiment of FIG. 1A—the arms 7 of the remote control are moved up to carrying the washing head T quite close to the insulator.

When carrying the washing head T close to the insulator, care must be taken—as said—to center the rings 13 or 113 exactly on the insulator, so that the jets of detergent liquid are evenly distributed over its surface.

For this purpose, the anchorage base 9—in the embodiment of FIG. 2—is centered in respect of the insulator, by leading its slit 9a into engagement with the insulator base 10.

In the embodiment of FIG. 7, the centering slit 9a is replaced by a pair of jaws 109 (not shown in detail), being opened when the head T draws close to the insulator, and being then closed and tightened onto the base 10 of said insulator.

After having positioned correctly the head T, the true and proper washing operation is started.

According to a first and simpler way of proceeding, detergent liquid is introduced in all the rings 13 and is sprayed, with an abundant flow, through all the nozzles. The insulator which, as said, is energized, is hit by an abundant jet of detergent liquid, up to complete washing.

To make positively sure that each part of the insulator is thoroughly washed, the insulating bodies 11 can be mounted on a support (not shown) apt to oscillate around the centre of the insulator, as indicated by the arrows F.

According to the invention, such a way of proceeding allows to prevent:
electric discharges towards the apparatus, since the washing head is electrically insulated, namely made of insulating material;
as well as electric discharges on the insulator, since the non-conductive abundant flow of detergent liquid prevents the forming of preferential discharge paths.

According to another way of proceeding—which also forms an important characteristic of the invention and which is adopted in particular conditions of pollution—the insulator is instead washed in parts at different levels. More precisely—referring, for example, to the insulator chain illustrated in FIG. 3—the detergent liquid is initially introduced only in the lowest distribution ring 13a of the washing head, so that the liquid jet flowing from its nozzles only hits the lower surface of the petticoat 3', which gets thoroughly washed, while all the other petticoats are kept dry by the air blown from the nozzles of the other rings 13.

The feeding is then changed over, so as to feed detergent liquid only to the ring 13b and thus wash the upper surface of the lowest petticoat 3' and the inner lower surface of the first overhanging petticoat 3": all the other rings are fed with drying air. A second part of the insulator, positioned above the previous one, is thus thoroughly washed.

The feeding is again changed over, so as to feed detergent liquid to the third ring 13c, while all the other rings are fed with drying air. A third part of the insulator is thus thoroughly washed, and precisely, a part just above that which had been previously washed.

The operation continues by successively washing all the insulator parts. The fact of washing only one part of the insulator at a time, while the others are kept dry, is a total guarantee against any possible risk of discharges, both towards the apparatus and on the insulator.

Preferably, detergent liquid is fed to the spray nozzles under high pressure, for instance higher than 4 MPa. Nevertheless, said pressure can even reach values of the order of 15 MPa, according to the nature and characteristics of adherence of the dirt settled on the insulator. In this way, the washing is highly efficient and can be completed in a few seconds, which reduces even more the risks of electric discharges.

Of course, what has been described above in relation to the half-rings 13, also applies to the arrangement of FIGS. 6 and 7, and therefore to the rings 113. Thus, as already seen in relation to the ring 13, also the ring 113—or, rather, its support—is apt to perform an oscillation of about 90°, allowing the nozzles 114 to slide all along the contour of the insulator.

To make the apparatus even safer and prevent any possible risk of electric discharges—especially in the case of simultaneously washing the whole surface of the insulator—the invention also provides, on the other hand, for the use of a screening system, for instance like that illustrated in FIG. 5. In this system, a plurality of compressed air jets, blown from the nozzles 17, produces an outwardly directed radial air stream 17a, which performs the function of outwardly deviating and thus interrupting the flow of detergent liquid streaming down the insulator petticoats; this prevents the liquid from forming a continuous path of connection between parts having a different electric potential.

In this arrangement, the air jets are also apt to perform a supplementary function. In fact, when compressed air is blown from the nozzles 17, it causes a reaction thrust on the half-rings 13, which pushes the two halves one towards the other and closes them into a single ring. This arrangement provides the advantage of no longer requiring a remote-control system for closing the half-rings.

In the screening system illustrated in FIGS. 6 and 7, the plates 115 and 116 perform the same function as the radial air stream blown from the nozzles 17. It should be noted that the sealing gasket 118 which, as said, bears against the inner edge of the lower contour of the insulator petticoat, prevents the detergent liquid streaming down the insulator from flowing, through capillarity, towards the inside of the insulator petticoat and coming in contact with electrically conductive parts.

When the washing head is drawn close to the insulator, the funnel formed between the strips 115a and 116a embraces the insulator and the surfaces of the strips slide on its lateral surface, thereby drawing apart the plates 115 and 116 and allowing the insulator to penetrate into the ring 113.

Of course, as already said, it is not strictly necessary for the screening plates 115 and 116—as, besides, for the nozzles 17 of the compressed air screening system—to be mounted in correspondence of the lower end of the insulator. Such a screening system can also be placed in an intermediate position of the insulator, since also in this position it is apt to perform the cited function of deviating or interrupting the flow of detergent fluid streaming down the insulator.

It is understood that the invention is not limited to the described and illustrated embodiments, but that there may be many other embodiments differing from the same, all within reach of an expert in the field and all thus falling within the protection scope of the invention itself. It should be noted, in particular, that the washing fluid need not necessarily be water, or a liquid in general; in fact, for particular types of pollution from dusts, it is possible to carry out the washing by simple jets of gaseous fluid, for instance air.

I claim:

1. Process for washing insulators supporting the conductors of an overhead electric live line, with the line energized, by means of a washing head (T) connected to means feeding a detergent fluid to a plurality of spray nozzles (14, 114) carried by the washing head (T) for spraying detergent fluid in close proximity to and over the surface of said insulator (3, 3A), characterized in that the washing head (T) is centered and anchored onto the insulator, and the washing of the insulator is carried out by feeding the detergent fluid to at least part of a plurality of tubular members (13, 113) connected to the washing head, the tubular members being positioned one above the other so as to be insulated one from the other and, in use, at least partially surrounding the insulator.

2. Process as in claim 1, wherein the detergent fluid is sprayed over the whole surface of said insulator (3, 3A).

3. Proces as in claim 1, wherein the washing of the insulator (3, 3A) is carried out in parts, at different levels, by spraying in succession detergent fluid over single parts (3', 3") of the insulator.

4. Process as in claim 3, wherein drying air is simultaneously blown over the other parts of the insulator.

5. Process as in claim 3, wherein each single part of the insulator comprises at least one insulator petticoat (3', 3").

6. Process as in claim 3, wherein each single part of the insulator comprises the opposed surfaces of two adjacent petticoats (3', 3").

7. Process as in claim 1, wherein the detergent fluid comprises demineralized water.

8. Process as in claim 1, wherein the detergent fluid comprises a gaseous fluid.

9. Process as in claim 4, wherein the drying air is dry hot air.

10. Process as in claim 1, wherein the detergent fluid is fed to the spray nozzles at a pressure of from about 4 MPa to about 15 MPa.

11. Process as in claim 10, wherein the detergent fluid is fed for at least two seconds.

12. Process as claim 1, wherein the fluid flowing down from the washed insulators is deviated by screening means (17, 115, 116, 118) interposed between parts (3) having a different electric potential.

13. Process as in claim 12 wherein a plurality of nozzles (17) blow jets of compressed air, directed radially from the inside to the outside of the insulator parts (3), said air jets performing the function of said screening means.

14. Apparatus for washing insulators supporting the conductors of an overhead electric live line, comprising a washing head (T) having a plurality of spray nozzles (14, 114), and means feeding a detergent fluid to the tubular member for spraying through the nozzles, characterized in that said head (T) comprises at least one insulating body (11, 111), means (9, 9a, 109) for centering and anchoring the insulating body onto the insulator (3), as well as plurality of said tubular U-shaped or ring members (13, 113) each carrying a plurality of spray nozzles (14, 114), said tubular members being mounted on said insulating body one above the other so as to be insulated one from the other and, in use, to at least partially surround the insulator.

15. Apparatus as in claim 14, wherein said spray nozzles (14, 114) are electrically insulated.

16. Apparatus as in claim 14, wherein said spray nozzles (14, 114) are evenly distributed along the contour of said ring member (13, 113).

17. Apparatus as claim 16, wherein four spray nozzles (114) are provided on each ring member (113), at about 90° one from one another.

18. Apparatus as claim 14, wherein each ring member is formed in two halves, each half being carried by a support arm (12) mounted oscillating on the washing head (T).

19. Apparatus as in claim 14, wherein each ring member comprises an open tubular element (113) developing over an arc of about 270°.

20. Apparatus as in claim 18, wherein the insulating body (11, 111) is formed of two distinct insulating support bodies, to each body there being fixed the support arms (12) for all the half-ring members (13) positioned on one of the two sides of the insulator, said insulating support bodies being mounted oscillating in respect of the washing head (T).

21. Apparatus as in claim 18, wherein the insulating body comprises a single insulating support body (11), onto which are mounted oscillating said arms (12) for the support of the half-ring members (13).

22. Apparatus as in claim 18, wherein means are provided for causing said support arms to oscillate from a drawn apart rest position, in which the respective half-ring members are distant from the insulator, to a working position, in which the half-ring members are drawn close to form continuous rings which strictly surround the insulator.

23. Apparatus as in claim 14, wherein said insulating body (11, 111) for the support of said ring members (13, 113) is mounted oscillating about the axis of the insulator (3).

24. Apparatus as in claim 14, comprising furthermore means for feeding to said nozzles detergent fluid or, alternatively, drying air.

25. Apparatus as in claim 24, wherein said feeding means comprise change-over means for feeding in succession detergent fluid to each ring member and to the respective nozzles, while drying air is simultaneously being fed to all the other ring members.

26. Apparatus as in claim 24, comprising screening means (17a, 115, 116) interposed between parts of the insulator having a different electric potential.

27. Apparatus as in claim 26, wherein to at least one of the ring members (13), or respectively to each half thereof, there is associated a plurality of supplementary nozzles (17), connected to a pipe (18) feeding compressed air, the compressed air jets blown from said nozzles producing an outwardly directed radial air stream (17a) which forms said screening means.

28. Apparatus as in claim 27, wherein said screening means consist of a pair of plates (115, 116), each in the form of a semicircular crown.

29. Apparatus as in claim 28, wherein said plates (115, 116) are hinged at one end in correspondence of the washing head (T) and they can be drawn apart against the action of spring return means.

30. Apparatus as in claim 29, wherein to the ends of said screening plates (115, 116), opposite to the hinging ends, there are associated curved strips (115a, 116a) forming a funnel.

31. Apparatus as in claim 28, wherein to the inner edge of said plates (115, 116) there is associated a resilient sealing gasket (118).

32. Apparatus as in claim 26, wherein said screening means (115, 116) are positioned just under the lower petticoat of the insulator.

33. Apparatus as in claim 26, wherein said screening means (115, 116) are interposed between two petticoats of the insulators, close to the highest of said two petticoats.

34. Apparatus as in claim 14, wherein said washing head (T) comprises a base (9) for centering and anchorage onto the support base of the insulator.

35. Apparatus as in claim 34, wherein said base (9) comprises an extension tailpiece (9a) provided with a centering slit apt to cooperate with the support base of the insulator.

36. Apparatus as in claim 34, wherein said base (9) comprises a pair of jaws (109) for its centering and anchorage onto the support base of the insulator.

37. Apparatus as in claim 36, wherein said screening means (115, 116) are mounted on said centering jaws (109).

38. Apparatus as in claim 14, wherein said washing head (T) is mounted on a remote control (4) adjustably mounted on a self-propelled carriage (6).

39. Apparatus as in claim 14, wherein said washing head (T) is mounted on a trolley (8) slidable along the pole supporting the electric line.

* * * * *